US008565843B1

(12) United States Patent
Lugo

(10) Patent No.: US 8,565,843 B1
(45) Date of Patent: Oct. 22, 2013

(54) PORTABLE DEVICE SHELL

(75) Inventor: Javier A. Lugo, Coral Gables, FL (US)

(73) Assignee: Lugovations LLC, Coral Gables, FL (US)

( * ) Notice: Subject to any disclaimer, the term of this patent is extended or adjusted under 35 U.S.C. 154(b) by 395 days.

(21) Appl. No.: 12/778,706

(22) Filed: May 12, 2010

Related U.S. Application Data

(60) Provisional application No. 61/177,806, filed on May 13, 2009.

(51) Int. Cl.
H04M 1/00 (2006.01)

(52) U.S. Cl.
USPC ..................................... 455/575.4; 455/556.1

(58) Field of Classification Search
CPC ................. H04M 1/72522; H04M 1/0237
USPC ................ 455/575.1–575.9, 556.1, 557, 90.3
See application file for complete search history.

(56) References Cited

U.S. PATENT DOCUMENTS

| | | | |
|---|---|---|---|
| 5,138,649 A | | 8/1992 | Krisbergh et al. |
| 5,189,358 A | * | 2/1993 | Tomura et al. ............. 455/575.9 |
| 5,189,632 A | * | 2/1993 | Paajanen et al. ........... 455/556.2 |
| 5,974,334 A | * | 10/1999 | Jones, Jr. ................... 455/556.2 |
| 5,982,355 A | | 11/1999 | Jaeger et al. |
| 6,192,236 B1 | | 2/2001 | Irvin |
| 6,346,891 B1 | * | 2/2002 | Feinleib et al. ............... 340/12.3 |
| 6,445,933 B1 | | 9/2002 | Pettit |
| 7,079,879 B1 | * | 7/2006 | Sylvester et al. .......... 455/575.8 |
| 7,221,960 B2 | * | 5/2007 | Schlegel .................... 455/556.1 |
| 7,376,441 B2 | | 5/2008 | Lee |
| 7,610,016 B2 | * | 10/2009 | Schmitt et al. ................ 455/557 |
| 7,612,997 B1 | * | 11/2009 | Diebel et al. ............. 361/679.56 |
| 7,831,276 B2 | * | 11/2010 | Kumar .......................... 455/557 |
| 8,064,952 B2 | * | 11/2011 | Rofougaran et al. ....... 455/556.1 |
| 2003/0186727 A1 | * | 10/2003 | Gurner ....................... 455/575.1 |
| 2004/0087335 A1 | * | 5/2004 | Peiker ........................ 455/556.2 |
| 2004/0121819 A1 | * | 6/2004 | Vogel ......................... 455/575.9 |
| 2005/0090301 A1 | * | 4/2005 | Lange et al. ................ 455/575.8 |
| 2005/0192051 A1 | | 9/2005 | Tokuhashi |
| 2006/0230192 A1 | * | 10/2006 | Parry et al. ...................... 710/15 |
| 2007/0035412 A1 | | 2/2007 | Dvorak et al. |
| 2007/0232233 A1 | * | 10/2007 | Liu et al. ...................... 455/41.2 |
| 2007/0238481 A1 | | 10/2007 | Gaucherot |
| 2008/0051160 A1 | * | 2/2008 | Seil et al. ................... 455/575.1 |
| 2008/0070621 A1 | | 3/2008 | Ou Yang et al. |
| 2008/0167094 A1 | * | 7/2008 | Dinh et al. ................. 455/575.3 |
| 2009/0005167 A1 | | 1/2009 | Arrasvuori et al. |
| 2009/0064279 A1 | | 3/2009 | Ardolino |
| 2009/0088204 A1 | * | 4/2009 | Culbert et al. ............. 455/556.1 |
| 2009/0156251 A1 | | 6/2009 | Cannistraro et al. |
| 2009/0163140 A1 | | 6/2009 | Packham et al. |
| 2010/0273530 A1 | * | 10/2010 | Jarvis et al. ................... 455/566 |
| 2011/0098087 A1 | * | 4/2011 | Tseng ........................ 455/556.1 |

* cited by examiner

Primary Examiner — Lana N Le
(74) Attorney, Agent, or Firm — Albert Bordas, P.A.

(57) ABSTRACT

A portable device shell, comprising an adapter assembly comprising a first cavity to snugly receive a portable electronic device and a control assembly comprising a second cavity to snugly receive the adapter assembly. Integrated electronics act in concert when the adapter assembly snugly receives the portable electronic device and the control assembly snugly receives the adapter assembly. An infrared emitter transmitter/receiver, radio frequency and/or a wireless medium control and receive status from third party devices. The control assembly comprises a battery as a power source. The portable electronic device is a hybrid mobile device, or having or serving as a phone and/or mobile communications platform, and comprises a first connector port and a screen.

16 Claims, 3 Drawing Sheets

PORTABLE DEVICE SHELL

OTHER RELATED APPLICATIONS

The present application claims priority of Provisional Application No. 61/177,806, filed on May 13, 2009, which is hereby incorporated by reference.

BACKGROUND OF THE INVENTION

1. Field of the Invention

The present invention relates to electronic accessories, and more particularly, to portable device shells for portable electronic devices.

2. Description of the Related Art

Numerous hybrid mobile devices like the "IPHONE"/"IPOD", "BLACKBERRY", "GOOGLE's ANDROID", and others have emerged as an efficient platform for communications. Sometimes the use of some applications might be cumbersome because of an actual physical design of the device. The "IPHONE" for example, is a good phone and mobile communications platform, but the device is often difficult to handle while using as a remote control and within gaming applications. Several applications exist that transform the "IPHONE" into a universal remote control. These applications usually require the "IPHONE" to be used in landscape mode making it difficult to use. The finish of the "IPHONE" is also slippery when holding the phone for extended periods of time and when channel surfing.

A solution to this issue is a hardware "shell" that will accommodate the "IPHONE" to make it easier to use and operate.

Applicant believes that one of the closest references corresponds to U.S. Pat. No. 7,612,997 (B1) issued to Diebel, et al. on Nov. 3, 2009 for a portable electronic device case with battery. However, it differs from the present invention because Diebel, et al. only teaches a case for an electronic device that protects and extends the battery life of the electronic device. The case has a lower case portion and an upper case portion, which assemble together to protect the top, side, and bottom edges of the electronic device. The lower case portion includes a battery to extend the battery life of the electronic device.

Applicant believes that another reference corresponds to U.S. Pat. No. 7,376,441 (B2) issued to Lee on May 20, 2008 for an apparatus and method of interacting with a mobile phone using a TV system. However, it differs from the present invention because Lee teaches an apparatus and a method for interacting with a mobile telephone. A remote control unit receives a user command and transmits it to a TV system, which recognizes the user command as a telephone function command and transmits the function command to the mobile telephone if the TV system is set to Telephone Mode. The TV system may also output data received from the mobile telephone in response to the transmitted function command. A user may interact with a mobile telephone using an interactive TV system by displaying text/image data received from the telephone and by inputting various telephone function commands using a remote control unit. Upon receiving a function command from the TV system, the mobile telephone generates output data in response to the function command and transmits into the TV system. A display unit of the TV system displays the text/image data, and a speaker outputs the sound data. As a result, a user may interact with a mobile telephone using a display unit and a speaker of an interactive TV system with a remote control unit.

Applicant believes that another reference corresponds to U.S. Pat. No. 6,445,933 (B1) issued to Pettit on Sep. 3, 2002 for a tele-remote telephone and remote control device. However, it differs from the present invention because Pettit teaches a teleremote device including a cordless or cellular telephone in combination with a remote controller for a television, VCR, satellite receiver, DVD device, and/or video game controller. The telephone and remote control device are provided in a single rechargeable unit. The device includes a telephone keypad on one side of the device, and a remote control keypad on the other side. To avoid accidental or inadvertent actuation of keys on one side of the device while intending use of the other side, a switch control element is provided to permit selective actuation of the telephone keypad or the remote control keypad. An off switch is provided to conserve battery power when the teleremote device is not in use. Indicator lights may also be provided to show which side of the device is actuated.

Applicant believes that another reference corresponds to U.S. Pat. No. 6,192,236 (B1) issued to Irvin on Feb. 20, 2001 for an apparatus and method for remote control of accessory devices using a radiotelephone as a receiver. However, it differs from the present invention because Irvin teaches a remote control commands provided to an accessory device utilizing a radiotelephone, such as a cellular telephone, as a receiver, which receives control commands over a wide area cellular network utilizing a remote control adaptor. The adaptor may take the form of a detachable adaptor attaching to the radiotelephone or a remote control battery pack replacing the normal battery pack for the radiotelephone or a connecting station serving as a remote control as well as a battery charger for the radiotelephone. Alternatively, a lock box is provided allowing remote actuated access to a compartment of the lock box. The radiotelephone acts as a receiver providing an audio signal to a tone signal decoder, which passes decoded and converted tone signals to a comparator, which assembles a command for comparison to a predetermined password. Switches are activated responsive to the comparison to control accessory devices. Power may be provided by the switching circuit to accessory devices from the radiotelephone system bus, battery or from a separate power source. A user's radiotelephone may thereby be converted on an as needed basis to operate as a receiver for remote control of accessory devices and readily return to normal use, as a radiotelephone when remote control is no longer required.

Applicant believes that another reference corresponds to U.S. Pat. No. 5,982,355 (B1) issued to Jaeger, et al. on Nov. 9, 1999 for a multiple purpose controls for electrical systems. However, it differs from the present invention because Jaeger, et al. teach an electrical circuit control devices affixed to the front of an electronic image display screen, within the image displaying area, to provide instantly changeable labels and other graphics, which convey information pertaining to operation of the controls. The control devices may be of any of a variety of types that are variously operated by depressing switch buttons, turning a knob, flexing or tilting a joystick or exerting force against an immovable knob. The control devices have compact and durable constructions, which enable the devices to be wholly at the front of the display screen as opposed to extending through openings in a screen. Operator manipulation of the control devices is variously sensed by radio frequency sensors, Hall effect sensors, strain gauge sensors, touch sensitive circuits or electromechanical contacts. A remote control unit controls any of variety of different electronic devices and displays different switch button labels and other graphics during controlling of different ones of the devices. A pivotable earpiece enables the same remote control unit to function as a cellular telephone and a cordless telephone.

Applicant believes that another reference corresponds to U.S. Pat. No. 5,138,649 (B1) issued to Krisbergh, et al. on Aug. 11, 1992 for a portable telephone handset with remote control. However, it differs from the present invention because Krisbergh, et al. teach a remote control for one or more appliances and a telephone handset combined into a single unit. A common keypad is used for both remote control and telephone functions. An appliance control signal is generated in response to the actuation of at least one of the keypad keys. The appliance control signal is transmitted via an infrared communication link. A telephone control signal is generated in response to the actuation of at least one of the keypad keys, and transmitted via an infrared or radio frequency communication link. Telephone audio signals from a microphone and to an earphone are communicated via a radio frequency communication link. The remote control/telephone handset is used in combination with a cable television converter/descrambler or satellite television receiver.

Applicant believes that another reference corresponds to U.S. Patent Application Publication No. 20090163140 (A1), published on Jun. 25, 2009 to Packham, et al. for a biochip electroportator and its use in multi-site, single-cell electroporation. However, it differs from the present invention because Packham, et al. teach a remote access and control system for remotely controlling a wide variety of devices using an application installed in a cell phone in conjunction with a control module in communication with the cell phone and the device. A portal-based access and control system is also disclosed.

Applicant believes that another reference corresponds to U.S. Patent Application Publication No. 20090156251 (A1), published on Jun. 18, 2009 to Cannistraro, et al. for a remote control protocol for media systems controlled by portable devices. However, it differs from the present invention because Cannistraro, et al. teach a flexible remote control protocol for a user with handheld electronic devices and media systems. The handheld electronic device may have remote control functionality in addition to cellular telephone, music player, or handheld computer functionality. The handheld electronic devices may have a touch sensitive display screen. The handheld electronic devices may generate remote control signals from gestures or user input that the handheld electronic device may receive. A media system may receive the remote control signals and may take appropriate action. The handheld electronic device may receive media system state information transmitted by the media system. The handheld electronic device may generate custom display screens when the media system state information is associated with a registered screen identification that has an associated custom display template. The handheld electronic device may generate generic display screens when the media system state information is not associated with a registered screen identification.

Applicant believes that another reference corresponds to U.S. Patent Application Publication No. 20090005167 (A1), published on Jan. 1, 2009 to Arrasvuori, et al. for Mobile Gaming with External Devices in Single and Multiplayer Games. However, it differs from the present invention because Arrasvuori, et al. teach methods, systems and apparatuses for gaming using one or more mobile communication devices and one or more remotely-controllable drones, the one or more mobile communication devices being adapted to remotely-control the one or more remotely-controllable drones; including providing game control software to one or more of the mobile communication devices, the game control software including rules for play affecting the operation of the remotely-controllable drones; and, operating a remotely-controllable drone using the mobile communication device with remote control within the rules of play.

Applicant believes that another reference corresponds to U.S. Patent Application Publication No. 20090064279 (A1), published on Mar. 5, 2009 to Ardolino for a system for secure remote access and control of computers. However, it differs from the present invention because Ardolino teaches a system that anyone with a internet browser can use to set up a high security VPN between a mobile wireless hand-held devices or computer and a remote computer and operate control the remote computer. An automated Internet browser sign-up process sets up a subscription to a VPN service and installs the required software components. A system to provide data and access control security as well as simulating a display, keyboard and mouse on a hand-held device with only a touch screen is also disclosed.

Applicant believes that another reference corresponds to U.S. Patent Application Publication No. 20090088204, published on Apr. 2, 2009 to Culbert, et al. for movement-based interfaces for a personal media device. However, it differs from the present invention because Culbert, et al. teach systems and methods for a media device including one or more movement-based interfaces for interfacing with or controlling the media device.

Applicant believes that another reference corresponds to U.S. Patent Application Publication No. 20080070621 (A1), published on Mar. 20, 2008 to Ou Yang, et al. for a digital cordless phone having remote control functionality. However, it differs from the present invention because Ou Yang, et al. teach a digital cordless phone having remote control functionality, whereby a telephone connection is established upon transmitting and receiving wireless telephony signals by a wireless transceiver module, and an MCU receives control signals from a remote terminal via the telephone connection to control the remote control module, by which the wireless transmission module is initiated to send out the corresponding wireless control signals. When an internet connection is established upon transmitting and receiving wireless internet signals by the wireless transceiver module, the MCU can download a control code set for an electronic device from a website via the internet connection, and the control code set is stored in a memory.

Applicant believes that another reference corresponds to U.S. Patent Application Publication No. 20070238481 (A1), published on Oct. 11, 2007 to Gaucherot for self-adhesive remote-control keyboard for a portable cellular telephone. However, it differs from the present invention because Gaucherot teaches a self-adhesive and sealed device having a deformable structure that enables, for example, a skier provided with a portable cellular telephone (a) connected to a transmission/reception interface (b) and to an earphone/microphone set (c) to transmit or receive telephone calls without taking off his gloves and without handling the portable telephone thereof. The keyboard is fixable to a support (a vehicle panel board, a motorcycle tank, clothes, on a flat part of ski) by means of an adhesive element (1) disposed on the lower face of a flexible pad (2). The pad is sealingly covered by an elastic shell (3), which comprises large keys (4) and a transparent window on the external face thereof. The sealed chamber, which is formed by the pad and shell, contains a battery, an electronic system for transmitting and receiving signals allocated to the interface of the portable telephone of a user and electric connections for said components. The anti-thief device of the keyboard is intrinsic in such a way that the keyboard is useless without the interface associated to the portable telephone.

Applicant believes that another reference corresponds to U.S. Patent Application Publication No. 20070232233 (A1), published on Oct. 4, 2007 to Liu, et al. for a wireless handset with "BLUETOOTH" remote control and dialing functionality on VoIP software application, and corresponding web phone. However, it differs from the present invention because Liu, et al. teach a wireless handset includes: a "BLUETOOTH" RF module for performing wireless communication with a Voice over Internet Protocol (VoIP) communication device having "BLUETOOTH" communication functionality; a processing circuit, coupled to the "BLUETOOTH" RF module, for remotely controlling a VoIP software application, which is embedded in the VoIP communication device, through the "BLUETOOTH" RF module according to "BLUETOOTH" Human Interface Device specifications; and an audio input/output module, coupled to the processing circuit, for receiving audio waves to input an audio signal into the processing circuit, and/or outputting audio waves; wherein the wireless handset provides web phone communication functionality by utilizing the VoIP software application.

Applicant believes that another reference corresponds to U.S. Patent Application Publication No. 20070035412 (A1), published on Feb. 15, 2007 to Dvorak, et al. for an application of profiles in a wireless device to control a remote control apparatus. However, it differs from the present invention because Dvorak, et al. teach a system (10) or method (50) for controlling a remote controlled apparatus that includes a remote controlled apparatus (18) and a remote controlling device (12). The remote controlling device can include a wireless transceiver (9) for controlling the remote controlled apparatus and a programmable memory (16) for storing profiles defining operation of the remote controlling device corresponding to the remote controlled apparatus. The wireless transceiver receives from the remote controlled apparatus data defining a profile or a selection signal for selecting among a plurality of stored profiles. The remote controlled apparatus can be an RC toy such as a car, boat or aircraft and the remote controlling device can be a phone or other transceiving device. The remote controlled apparatus can include a stored profile that can be modified using an exchangeable housing (26, 28 or 44) having a predefined set of mechanisms for activating switches on the remote controlled apparatus.

Applicant believes that another reference corresponds to U.S. Patent Application Publication No. 20050192051 (A1), published on Sep. 1, 2005 to Tokuhashi for a mobile terminal-based remote control technique. However, it differs from the present invention because Tokuhashi teaches a remote control program installed in a cell phone that is activated to read a window number allocated to an operation window output and displayed on a TV receiver from a memory unit of the cell phone and to display corresponding help information on a display unit of the cell phone (steps S100 and S110). In response to the user's manipulation of one of buttons on an operation unit of the cell phone, the remote control program displays button function information representing the functions of the respective buttons on the operation unit, while converting an input signal into an operation signal and sending the converted operation signal together with the window number (steps S120 to S150).

Other patents describing the closest subject matter provide for a number of more or less complicated features that fail to solve the problem in an efficient and economical way. None of these patents suggest the novel features of the present invention.

SUMMARY OF THE INVENTION

The instant invention is a portable device shell. More specifically, the instant invention is a portable device shell, comprising an adapter assembly comprising a first cavity to snugly receive a portable electronic device and a control assembly comprising a second cavity to snugly receive the adapter assembly. The instant invention further comprises integrated electronics that act in concert when the adapter assembly snugly receives the portable electronic device and the control assembly snugly receives the adapter assembly. The control assembly further comprises an infrared emitter transmitter/receiver, radio frequency and/or a wireless medium to control and receive status from third party devices. The control assembly comprises a battery as a power source.

The portable electronic device is a hybrid mobile device, or having or serving as a phone and/or mobile communications platform, and comprises a first connector port and a screen. The adapter assembly comprises a first connector that inserts into the first connector port when the first cavity snugly receives the portable electronic device. The adapter assembly comprises a second connector port. The control assembly comprises a second connector that inserts into the second connector port when the second cavity snugly receives the adapter assembly.

The adapter assembly comprises an exterior top face, an exterior bottom face, and first and second exterior lateral faces. The adapter assembly further comprises an exterior front face and an exterior rear panel. The exterior bottom face comprises the second connector port, and the exterior front face comprises at least one control button. The adapter assembly further comprises an interior top face, an interior bottom face, first and second interior lateral faces, and an interior rear face.

The control assembly comprises an exterior top face, an exterior bottom face, and exterior first and second lateral faces. The control assembly further comprises an exterior front face and an exterior rear panel. The exterior front face comprises control buttons to operate functions including volume, navigation keys, and channel controls. The control assembly further comprises an interior top face, an interior bottom face, and first and second interior lateral faces, and together with a interior rear face, define the second cavity.

All the adapter assemblies are of a same size to fit within the second cavity. The control assembly further comprises an infrared emitter to directly control audiovisual equipment, thus allowing direct control of audiovisual gear through an embedded software application. An infrared emitter receiver can learn commands from other remote controls to learn infrared emitter commands and be able to transmit them through the infrared emitter to control equipment.

It is therefore one of the main objects of the present invention to provide a portable device shell that easily accommodates a portable electronic device to function as a control and gaming device.

It is another object of the present invention to provide a portable device shell that easily accommodates a portable electronic device for easier use and operation.

It is another object of the present invention to provide a portable device shell that is ergonomically designed.

It is another object of the present invention to provide a portable device shell that is lightweight.

It is another object of the present invention to provide a portable device shell that is volumetrically efficient for carrying, transporting, and storage.

It is another object of the present invention to provide a portable device shell that can be readily assembled and disassembled without the need of any special tools.

It is another object of the present invention to provide a portable device shell, which is of a durable and reliable construction.

It is yet another object of this invention to provide such a portable device shell that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
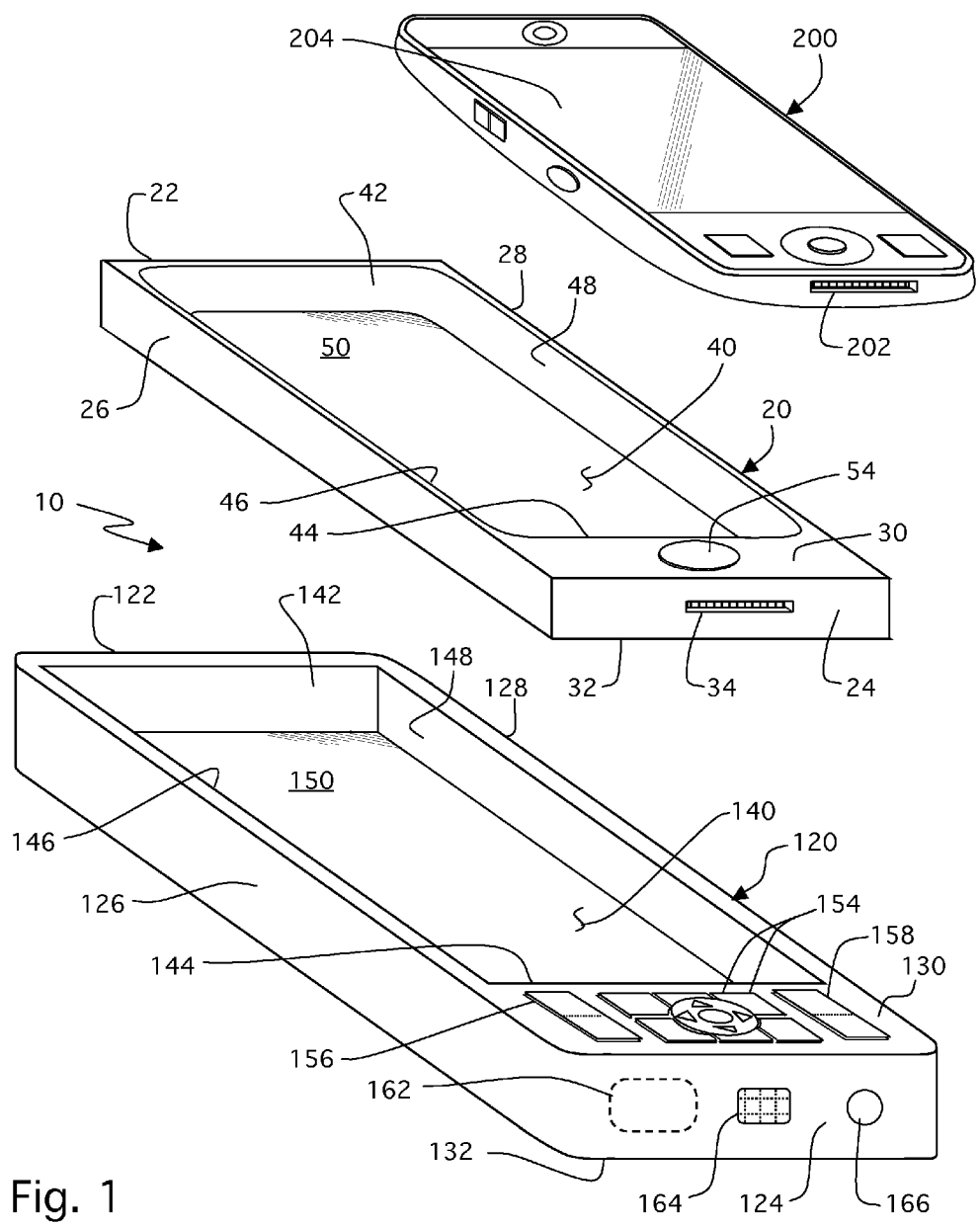
FIG. 1 is a first isometric disassembled view of the present invention, and a portable electronic device.

Referring now to the drawings, the present invention is a portable device shell, and is generally referred to with numeral 10. It can be observed that it basically includes adapter assembly 20 and control assembly 120.

Figure 2:
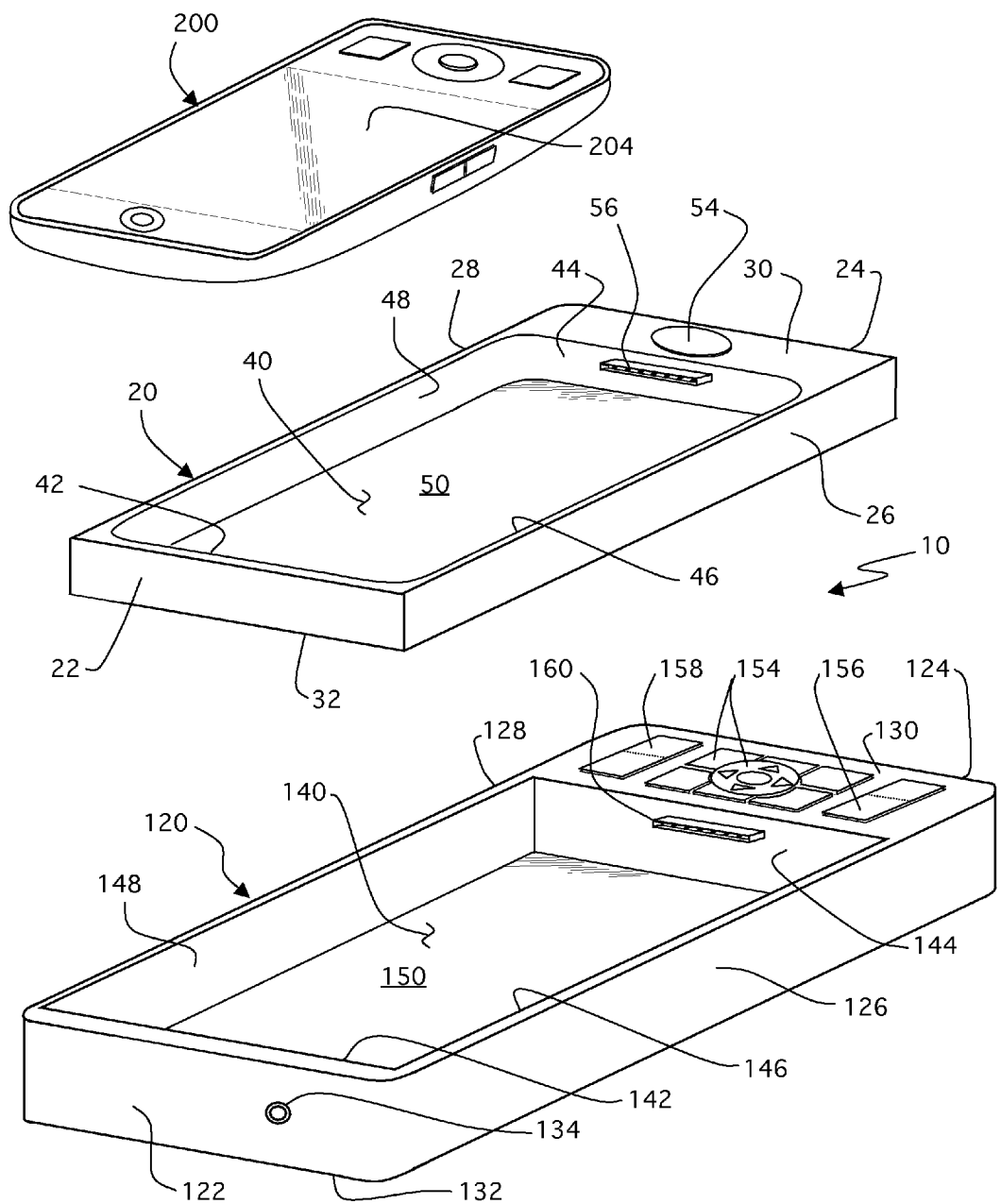
FIG. 2 is a second isometric disassembled view of the present invention, and the portable electronic device.

As seen in FIGS. 1 and 2, portable electronic device 200 is a hybrid mobile device, and is further defined as any portable electronic device such as, but not limited to, products manufactured by Apple, Inc. such as "IPHONE", "IPOD", and "IPAD", and others like "BLACKBERRY", or "ANDROID" having or serving as a phone and/or portable media display device. Portable electronic device 200 has connector port 202 and screen 204.

Adapter assembly 20 is designed to snugly receive portable electronic device 200. Adapter assembly 20 comprises exterior top face 22 opposite from exterior bottom face 24, and exterior lateral faces 26 and 28. Adapter assembly 20 further comprises exterior front face 30 and exterior rear panel 32. In a preferred embodiment, exterior bottom face 24 comprises connector port 34, and exterior front face 30 comprises at least one control button 54. Adapter assembly 20 further comprises interior top face 42 opposite from interior bottom face 44, and interior lateral faces 46 and 48 that, together with interior rear face 50 define cavity 40. In a preferred embodiment, interior bottom face 44 comprises connector 56 that inserts into connector port 202.

Instant invention 10 may comprise a plurality of adapter assemblies 20, each configured to receive various shapes of the various portable electronic devices 200.

Control assembly 120 is designed to snugly receive adapter assembly 20. Control assembly 120 comprises exterior top face 122 opposite from exterior bottom face 124, and exterior lateral faces 126 and 128. Control assembly 120 further comprises exterior front face 130 and exterior rear panel 132. In a preferred embodiment, exterior front face 130 comprises control buttons 154, 156, and 158. Control assembly 120 further comprises interior top face 142 opposite from interior bottom face 144, and interior lateral faces 146 and 148 that, together with interior rear face 150, define cavity 140. In a preferred embodiment, interior bottom face 144 comprises connector 160 that inserts into connector port 34. It is noted that all adapter assemblies 20 are of a same size to fit within cavity 140 of control assembly 120.

Control assembly 120 provides a better grip, an extended battery, and more ergonomically accessible buttons when using portable electronic device 200. As an example, control button 156 can be used to operate a function like volume. Control button 154 can be used to operate navigation keys, and control button 158 can be used to operate general functions such as channel controls. Control buttons 154, 156, and 158 are ergonomically positioned "hard" buttons, whereby functions like volume up/down, channel up/down, and navigation keys can be easily accessible. These buttons can be operated even though screen 204 of portable electronic device 200 is "off" to save battery life.

Screen 204 of portable electronic device 200 will still be used as a touch sensitive surface for ease of navigation.

Instant invention 10 further comprises the following hardware and features as an audiovisual electronics control. Control assembly 120 comprises infrared emitter 134 to directly control audiovisual equipment. This will allow instant invention 10 to directly control audiovisual gear through an embedded application. An infrared emitter receiver can learn commands from other remote controls, this will allow instant invention 10 to learn infrared emitter commands and be able to transmit them through infrared emitter 134 to control other equipment.

Control assembly 120 further comprises an infrared emitter transmitter/receiver, radio frequency, and/or a wireless medium such as "Z-WAVE" and/or "ZIGBEE" radio to control third party devices. This will allow instant invention 10 to control and receive status from other devices including, but not limited to, light dimmers/switches, air conditioner, and other compatible sensors.

Control assembly 120 allows for an extended battery, whereby it comprises built-in battery 162.

Instant invention 10 can fit within an enclosure protected by a touch-sensitive, anti-glare surface, which at the same time could magnify an image for ease of operation. The surface could also be textured and "click" when pressed to provide a better tactile feel.

Furthermore, instant invention 10 may also serve as an automobile entertainment interface, whereby it will replace a vehicle's original equipment manufacturer radio and provide an easy connecting area for portable electronic device 200.

Once connected to a vehicle's connector, not seen, instant invention 10 having portable electronic device 200, allows to natively access Global Positioning System "GPS", music, video, and other pertinent options. Instant invention 10 provides constant power as well as external antennas to portable electronic device 200. External antennas could extend range to a cellular signal as well as the GPS. It could also include audio services not limited to AM, FM, HD, "XM", and/or "SIRIUS" radio circuitry. When portable electronic device 200 is connected to instant invention 10, and instant invention 10 is connected to the vehicle, it will gain access to these extra functions through connector port 202 and with the use of software. "BLUETOOTH" capability can also provide hands free operation. Furthermore, a user could access numerous Internet based entertainment streams presently not available in existing vehicle radios. In some instances, portable electronic device 200 with instant invention 10 will Internet access to any other WIFI based device in the vehicle with the use of a built-in wireless router in instant invention 10.

Extra circuitry can be added to allow reception of audio services not limited to AM, FM, and HD radio terrestrial signals as well as "XM" and "SIRIUS" radio satellite programming. A custom application and interface handles tuning and radio reception features.

Instant invention 10 may also comprise a GPS antenna to improve range of the built-in GPS antenna, and a WIFI antenna and/or radio to better connect to an existing WIFI network. The built-in Internet connection of instant invention 10 can also be shared from within the vehicle to other computing devices like laptops and game consoles. This assumes that the service provider allows this type of "tethered" connection.

In the case of portable electronic devices 200 such as "IPHONE" and "IPOD TOUCH", instant invention 10 synchronizes digital media and other information wirelessly when arriving at the user's home base where the media is stored. Instant invention 10 can stay "on" using the internal battery during the synchronization process. If the process takes longer than the battery allows, it could use the vehicle's battery. Instant invention 10 will turn off before draining the vehicle's battery.

Instant invention 10 may also comprise external microphone 164 and speaker 166 to allow it to serve as a hands-free phone, and a radio digital recorder to allow it to record (time shift) live radio broadcasts using a built-in storage capacity. Instant invention 10 can record prescheduled programming while the vehicle is not in use for later enjoyment. In this case, the user will be able to skip unwanted content as desired.

An ergonomic design is a critical aspect for instant invention 10 to physically optimize for current use.

Figure 3:
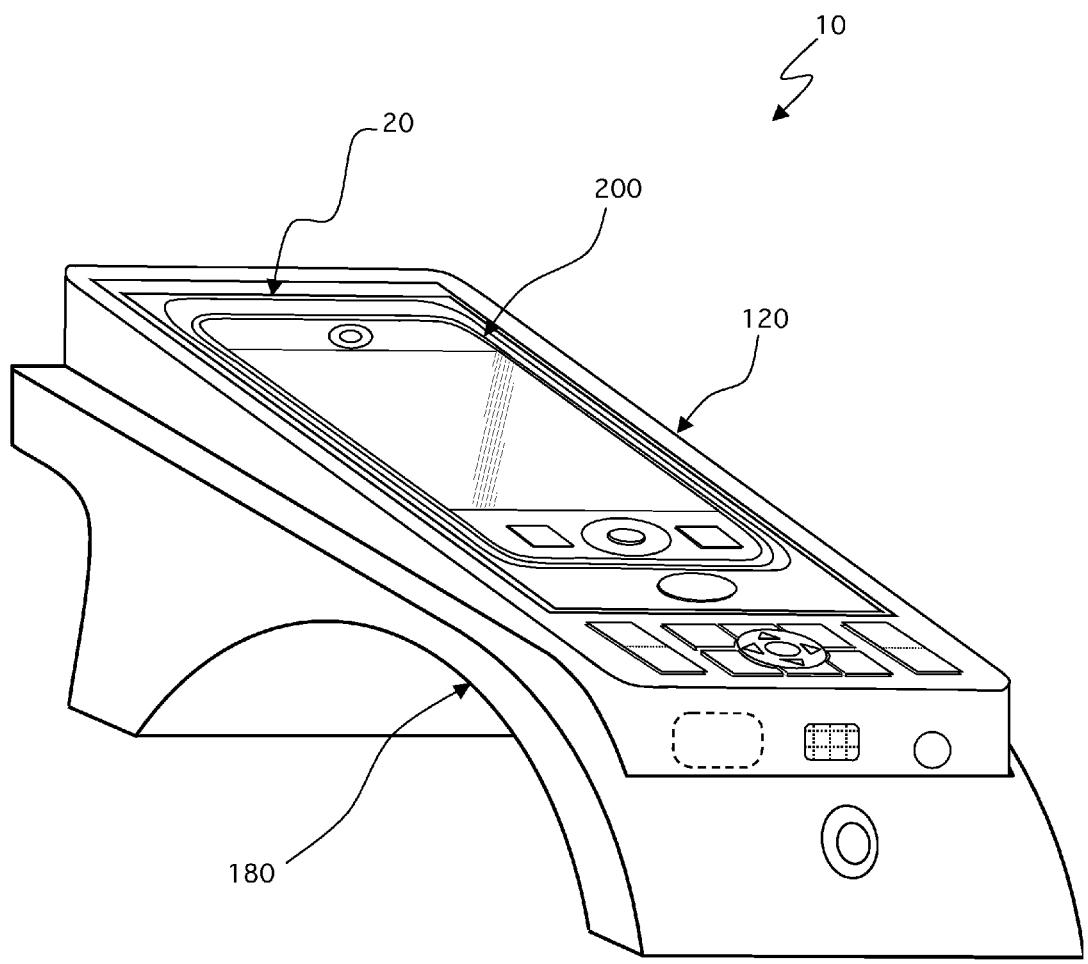
FIG. 3 is an isometric assembled view of the present invention charging in a cradle with the portable electronic device.

As seen in FIG. 3, control assembly 120 can also fit within cradle 180 for easy recharging.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device shell, comprising:
A) an adapter assembly comprising a first cavity to snugly receive a portable electronic device that comprises a first connector port and a screen, said adapter assembly further comprising a first exterior top face opposite from a first exterior bottom face, first and second exterior lateral faces, a first exterior front face and a first exterior rear panel, said adapter assembly further comprises a first interior top face opposite from a first interior bottom face, and first and second interior lateral faces that, together with said interior first rear face define said first cavity, said first exterior bottom face comprises a first connector port and said first exterior front face comprises at least one control button, said first interior bottom face comprises a first connector that inserts into said first connector port when said first cavity snugly receives said portable electronic device;
B) a remote control assembly comprising a second cavity to snugly receive said adapter assembly, said remote control assembly further comprising a second exterior top face opposite from a second exterior bottom face, third and fourth exterior lateral faces, a second exterior front face and second exterior rear panel, said remote control assembly further comprises a second interior top face opposite from a second interior bottom face, and third and fourth interior lateral faces that, together with said second interior rear face, define said second cavity, said second interior bottom face comprises a second connector that inserts into said second connector port when said second cavity snugly receives said adapter assembly; and
C integrated electronics that act in concert when said adapter assembly snugly receives said portable electronic device.

2. A device shell, comprising:
A) an adapter assembly comprising a first cavity to snugly receive a portable electronic device that comprises a first connector port and a screen, said adapter assembly further comprising a first exterior top face opposite from a first exterior bottom face, first and second exterior lateral faces, a first exterior front face and a first exterior rear panel, said adapter assembly further comprises a first interior top face opposite from a first interior bottom face, and first and second interior lateral faces that, together with said first interior rear face define said first cavity, said first exterior bottom face comprises a first connector port and said first exterior front face comprises at least one control button, said first interior bottom face comprises a first connector that inserts into said first connector port when said first cavity snugly receives said portable electronic device;
B) a control assembly comprising a second cavity to snugly receive said adapter assembly; and
C) integrated electronics that act in concert when said adapter assembly snugly receives said portable electronic device and said control assembly snugly receives said adapter assembly, said control assembly further comprises an infrared emitter to directly control electronic equipment, thus allowing direct control of electronic gear through an embedded software application, an infrared emitter receiver can learn commands from other remote controls to learn infrared emitter commands and be able to transmit them through said infrared emitter to control equipment.

3. A portable device shell, comprising:
A) an adapter assembly comprising a first cavity to snugly receive a portable electronic device that comprises a first connector port and a screen, said adapter assembly further comprising a first exterior top face opposite from a first exterior bottom face, first and second exterior lateral faces, a first exterior front face and a first exterior rear panel, said adapter assembly further comprises a first interior top face opposite from a first interior bottom face, and first and second interior lateral faces that, together with said first interior rear face define said first cavity, said first exterior bottom face comprises a first connector port and said first exterior front face comprises at least one control button, said first interior bottom face comprises a first connector that inserts into said first connector port when said first cavity snugly receives said portable electronic device;
B) a remote control assembly comprising a second cavity to snugly receive said adapter assembly, said remote control assembly further comprising a second exterior top face opposite from a second exterior bottom face, third and fourth exterior lateral faces, a second exterior front face and second exterior rear panel, said remote control assembly further comprises a second interior top face opposite from a second interior bottom face, and third and fourth interior lateral faces that, together with said second interior rear face, define said second cavity, said second interior bottom face comprises a second connector that inserts into said second connector port when said second cavity snugly receives said adapter assembly; and C) integrated electronics that act in concert when said adapter assembly snugly receives said portable electronic device and said remote control assembly snugly receives said adapter assembly, said remote control assembly further comprises an infrared emitter to directly control electronic equipment, thus allowing direct control of electronic gear through an embedded software application, an infrared emitter receiver can learn commands from other remote controls to learn infrared emitter commands and be able to transmit them through said infrared emitter to control equipment.

4. The portable device shell set forth in claim 3, further characterized in that said second exterior front face comprises control buttons.

5. The portable device shell set forth in claim 4, further characterized in that said remote control assembly provides a grip, an extended battery with a built-in battery power source, and buttons when using said portable electronic device.

6. The portable device shell set forth in claim 5, further characterized in that said control buttons are hard buttons to control functionalities including volume, operate navigation keys, or operate channel controls.

7. The portable device shell set forth in claim 6, further characterized in that said control buttons can be operated even though a screen of said portable electronic device off to save battery life.

8. The portable device shell set forth in claim 7, further characterized in that said remote control assembly further comprises an infrared emitter to directly control electronic equipment and compatible gear including electronic gear through an embedded application, whereby an infrared emitter receiver can learn commands from other remote controls to learn infrared emitter commands and be able to transmit them through said infrared emitter to control said electronic equipment, and said remote control assembly further comprises an infrared emitter transmitter/receiver, radio frequency, or wireless medium to control and receive status from said electronic equipment.

9. The portable device shell set forth in claim 8, further characterized in that said portable electronic device is a hybrid mobile device, or having or serving as a phone or portable communications platform.

10. The portable device shell set forth in claim 3, further characterized in that said adapter assembly, said remote control assembly, and said integrated electronics can fit within an enclosure protected by a touch-sensitive, anti-glare surface, which at the same time could magnify or enhance an image for ease of operation.

11. The portable device shell set forth in claim 10, further characterized in that said enclosure comprises a textured surface to provide a tactile feel.

12. The portable device shell set forth in claim 10, further characterized in that said adapter assembly, said remote control assembly, and said integrated electronics serve as an automobile entertainment interface to replace a vehicle's original equipment manufacturer radio and provide a connecting area for said portable electronic device.

13. The portable device shell set forth in claim 10, further characterized in that said adapter assembly, said remote control assembly, and said integrated electronics provide constant power as well as external antennas to said portable electronic device, said external antennas extend range to a cellular signal as well as a global positioning system.

14. The portable device shell set forth in claim 13, further characterized in that said remote control assembly further comprises an external microphone and speaker to serve as a hands-free phone, and a radio digital recorder to record live radio broadcasts using a built-in storage capacity.

15. The portable device shell set forth in claim 13, further characterized in that said remote control assembly fits within a cradle for recharging.

16. The portable device shell set forth in claim 10, further characterized in that said adapter assembly, said remote control assembly, and said integrated electronics further comprise a global positioning system antenna to improve range of a built-in global positioning system antenna, and a WIFI antenna or radio to connect to an existing WIFI network, and a built-in Internet connection of can be shared from within a vehicle to computing devices including laptops and game consoles when a service provider allows a tethered connection.

* * * * *